Patented June 7, 1949

2,472,206

UNITED STATES PATENT OFFICE 2,472,206

CEMENTITIOUS REFRACTORY AND METHOD OF MAKING

Lz Elsworth Greene, Muskegon, Mich.

No Drawing. Application February 28, 1948,
Serial No. 12,139

2 Claims. (Cl. 106—68)

The present invention relates to a cementitious composition and more particularly to high temperature refractory cement.

The primary objects of the instant invention are to provide a cementitious composition of the general character above indicated which is highly resistant to oxidation when used to cement fire brick; to provide such a composition which when used to cement fire brick, forms a fire resisting seal between the laid brick; to provide such a composition which requires no stirring prior to application; to provide such a composition which is highly efficient in its intended use; to provide such a composition which may be readily and conveniently composed; and, to provide such a composition which is reasonably economical in manufacture.

As an example, I have found the following composition highly effective for the purposes of its intended use:

Ten (10) parts by weight ground fire clay;
One (1) part by weight nitre cake;
One (1) part by weight salt;
One (1) part by weight sand blast or ground silica sand; and
A portion of iron filings not to exceed one-twentieth by weight of the fire clay, nitre cake, salt and silica sand.

The sand particularly adaptable for use is such as that that has been used in the cleaning of metal castings and the metal filings especially well adapted for use in the composition are those such as are found in dust from an emery wheel used in grinding or polishing metal parts.

Water is next added to the composition, the amount thereof varying depending upon the desired thickness of the resulting mix, no stirring of the composition being required prior to its application since the chemical reaction between the nitre cake and iron filings with the water stirs or "boils" the composition in a manner similar to that when yeast is effective in causing dough to rise.

It will thus be seen that the cementitious composition herein disclosed is highly resistant to oxidation, forms a fire resisting seal between laid brick, requires no stirring prior to application, is highly efficient in its intended use, may be readily and conveniently composed, and is reasonably economical in manufacture.

While but one specific example of the composition of the invention has been herein disclosed, it will be understood that the proportions of the several ingredients mentioned may be varied in the manner suggested in the appended claims.

I claim:

1. A compound consisting of ten (10) parts by weight of ground fire clay, one (1) part by weight of nitre cake, one (1) part by weight of salt, one (1) part by weight of silica sand, a portion of iron filings not to exceed one twentieth by weight of the fire clay, nitre cake, salt and silica sand, and a selected volume of water.

2. The method of making a high temperature refractory cementitious composition which comprises the act of mixing ten (10) parts by weight of ground fire clay, one (1) part by weight of nitre cake, one (1) part by weight of salt, one part by weight of silica sand, a portion of iron filings not to exceed one-twentieth by weight of the fire clay, nitre cake, salt and silica sand, and a selected volume of water.

LZ ELSWORTH GREENE.

No references cited.